Oct. 6, 1925. 1,556,332

J. I. GORMAN

CHECK VALVE

Filed May 10, 1924

INVENTOR.
John I. Gorman.
By Baker, Mocklin, Goldrick & Karr,
ATTYS.

Patented Oct. 6, 1925.

1,556,33

UNITED STATES PATENT OFFICE.

JOHN I. GORMAN, OF CLEVELAND, OHIO, ASSIGNOR TO THE MIDLAND BANK, TRUSTEE, OF CLEVELAND, OHIO, A CORPORATION OF OHIO.

CHECK VALVE.

Application filed May 10, 1924. Serial No. 712,184.

*To all whom it may concern:*

Be it known that I, JOHN I. GORMAN, a citizen of the United States, residing at Cleveland, in the county of Cuyahoga and State of Ohio, have invented a certain new and useful Improvement in a Check Valve, of which the following is a full, clear, and exact description, reference being had to the accompanying drawings.

This invention is concerned with valves and has for its general object the provision of a sensitive check valve adaptable for use in hot water heating systems.

A more specific object of my invention is the provision of a check valve construction the checking or obstructing element of which is disposed within the valve body in such manner as to remain normally unseated whereby the circulation of the water in the system, due to convection, may be normally unobstructed by the checking element of the valve.

Other objects of my invention will hereinafter be set forth in the following description referring to the accompanying drawing illustrating a preferred form thereof.

Figure 3:
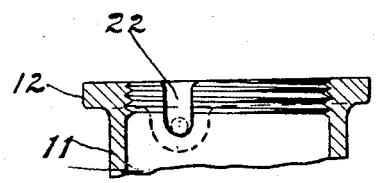
Figure 1:
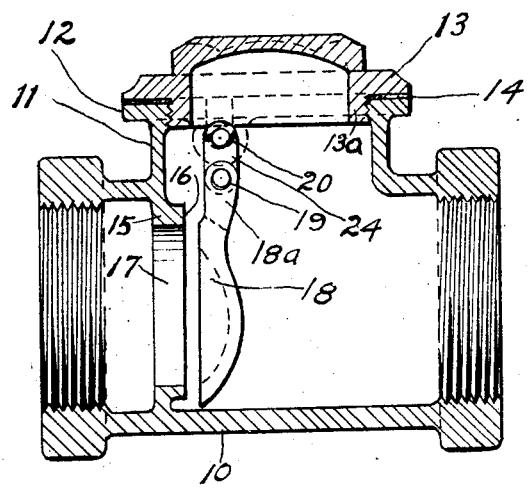
Figure 2:
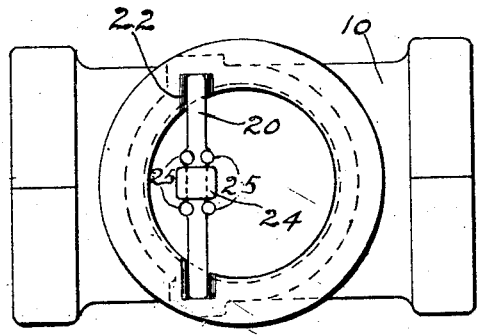

In the drawings, Fig. 1 is a cross-sectional view of a check valve embodying the novel features of my invention; Fig. 2 is a top view of the valve body and check member with a closure member removed; and Fig. 3 is a fragmentary cross-sectional view of the top branch of the valve body.

It has been the prevailing practice to install check valves in hot water heating systems, which valves are provided with seats inclined toward the pivotal center of the check member, whereby the valve closure member is normally seated. The weight of this valve closure member is usually such however, so that the convective action of the water due to changes in temperature in the system is interfered with. Since the installation of such check valves in hot water systems is for the incidental purpose of drawing off hot water from the top of the boiler or top parts of the system while checking the flow of the cooler water in the lower part of the system in its passage to the tap, it will be seen that the foregoing practice of installing a valve which normally remains seated, to obtain this incidental feature greatly interferes with the general efficiency of the system.

I accordingly construct a check valve, the valve seat of which will be disposed in a substantially vertical plane when the valve is properly installed and the check or valve member is suspended within the valve body to be normally in an unseated relation to the valve seat. I also provide a double pivot suspension feature for this check member whereby the check member may readily swing to its seating position when the hot water tap on the line is opened.

In Fig. 1 I show the usual fitting comprising a valve body 10 of a T-shape, the branch 11 of which is provided with a flange 12 whereby a top cap or closure 13 may be removably positioned thereon to clamp a gasket 14 to seal the branch. Formed within the valve body and adjacent one end thereof is a partition wall 15 provided with a valve seat 16. The passageway 17 of the wall 15 is adapted to be closed by a valve member 18 suspended upon pivot pins 19 and 20. The top pin 20 is of sufficient length to span the branch opening of the valve body and bear in the end walls of slots 22 extending from the face, of the flange 12 of the branch, downwardly within the throat of the branch a substantial distance whereby the threaded portion 13$^a$ of the closure member 13, extending into the throat of the branch, may serve as a retaining means to keep the pin 20 in position when once inserted in the valve. Suspended by the pin 20 is a link 24 which is maintained upon the pin in a position centrally of the branch opening by any suitable means such as lugs 25 formed on the pin. The link 24 extends downwardly between the apertured prongs of a bifurcated portion 18$^a$ of the valve member 18. A pin 19 extending between and bearing in these prongs engages the lower end of the link 24. The pin 19 may be maintained in position by any suitable means such as a tight fit in the link 24 or by upsetting the ends.

It will be seen that several advantages are afforded in the manufacture of my valve in that only drilling and tapping operations are involved to completely finish the valve body and parts. The valve seat is disposed in alignment with the threaded main branches of the valve body and can be readily and accurately finished. The double pivot arrangement, while being very simple to provide from a manufacturing view point, affords a sensitive suspension of the valve member 18 and the suspension of the valve member upon pins involves no machining operations on the valve body, the slots 22 being formed in the casting of the valve. The pivotal connection for the link 24 may be purposely made loose to further insure the proper seating of the valve member 18 upon the seat 16 without involving any additional steps in the manufacture of the valve. Furthermore the mere assembling of the closure or cap member 13 to close the branch opening also serves to maintain the valve suspension pin 20 in its proper inserted position. And finally the valve check member is normally unseated and does not obstruct the normal convective circulation of the water in the system.

I claim:

1. In a check valve of the character described, the combination of a valve body member provided with a partitioning wall having a passageway and a surrounding seat, a valve closure member adapted to coact with the seat, and means affording a double pivotal free suspension for the valve closure member whereby the closure member is normally in an unseated position.

2. In a check valve of the character described, the combination of a valve body member provided with a partitioning wall having a passageway and a surrounding seat, a valve closure member adapted to coact with the seat to close the passageway, a branch on the valve body and means disposed within the branch throat affording plural pivotal suspension for the valve closure member said means being spaced relative to the seat to normally suspend the closure member freely and in unseated position.

3. In a check valve of the character described, the combination of a valve body having an interiorly formed seat comprising a substantially vertically disposed seat, a valve check member cooperating with the seat and double pivotal means suspending the check member in juxtaposition to the seat but normally out of contact with the seat.

In testimony whereof, I hereunto affix my signature.

JOHN I. GORMAN.